United States Patent
Walters et al.

[15] 3,652,175
[45] Mar. 28, 1972

[54] ADJUSTABLE MULTIPLE SPINDLER DRILL HEAD

[72] Inventors: William D. Walters, Ridgewood; Robert J. Doocey, Upper Saddle River, both of N.J.

[73] Assignee: Standard Tool & Manufacturing Co.

[22] Filed: July 13, 1970

[21] Appl. No.: 54,183

[52] U.S. Cl. .............................................. 408/46, 74/826
[51] Int. Cl. ......................................................... B23b 39/16
[58] Field of Search ................ 408/46, 48; 74/826; 144/112

[56] References Cited

UNITED STATES PATENTS

| | | | |
|---|---|---|---|
| 3,124,017 | 3/1964 | Brainard et al. | 408/46 X |
| 3,203,282 | 8/1965 | Wilson | 408/46 |

FOREIGN PATENTS OR APPLICATIONS

| | | | |
|---|---|---|---|
| 2,003 | 0/1886 | Great Britain | 408/46 |
| 362,585 | 1922 | Germany | 408/48 |

Primary Examiner—Andrew R. Juhasz
Assistant Examiner—Z. R. Bilinsky
Attorney—Harness, Dickey & Pierce

[57] ABSTRACT

The adjustable drill head of the multiple spindle type has particular use in transfer or like machine lines as it can produce different diametrically and angularly spaced drill holes which heretofore required a number of fixed multiple spindle drill heads although requiring an increase in time. The cost of each fixed multiple spindle drill head and the number required for different diameters and number of holes to be drilled results in a cost which is extremely high. When drilling a flange, such as on a pipe, pump casting and those of other devices, a pair of spindles are adjustably spaced to the diameter between the drilled holes and are indexed to different angular positions to produce a multiple of holes spaced equal distance apart within the time required to perform prior or subsequent machining operations at other stations in the line.

9 Claims, 6 Drawing Figures

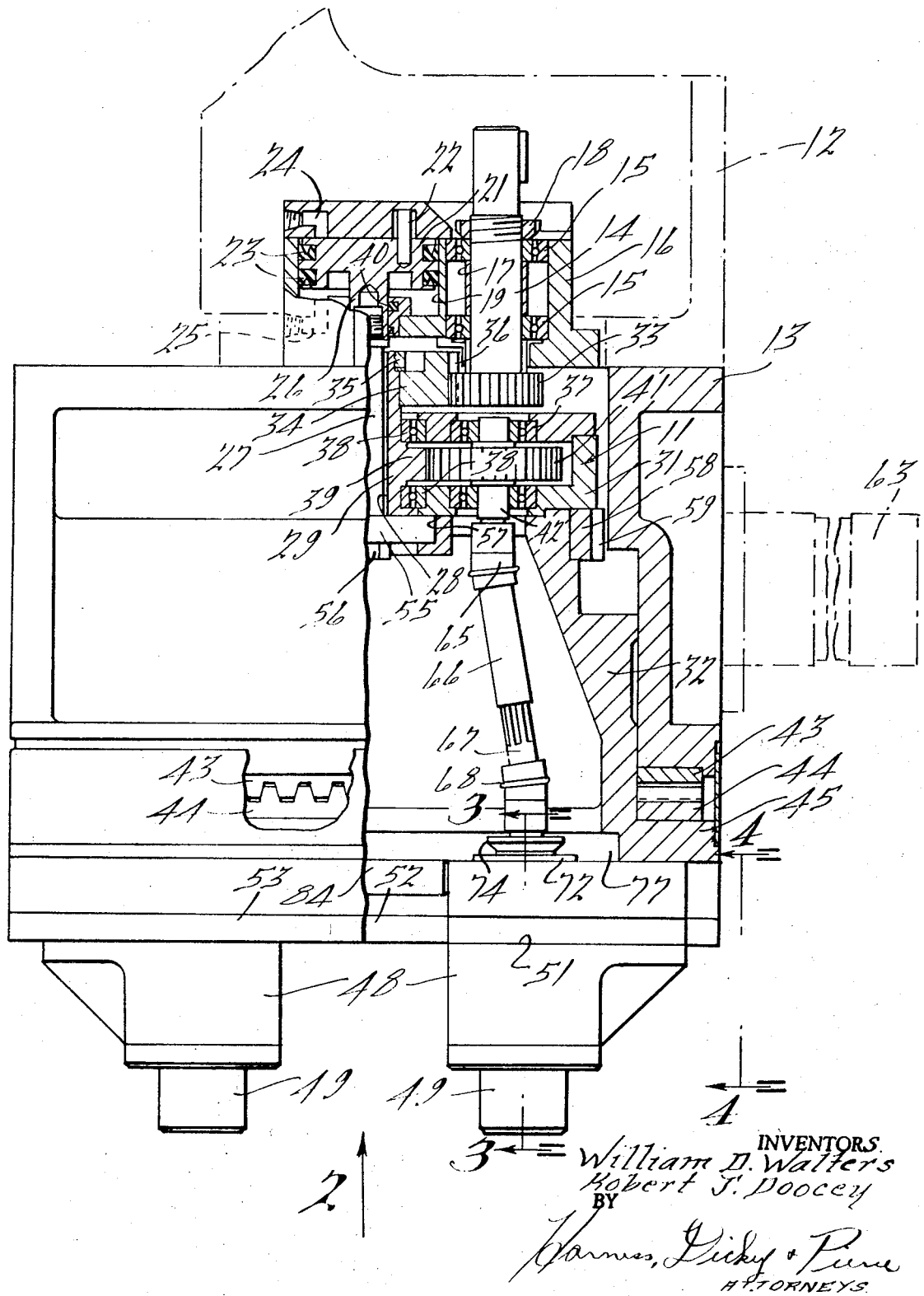

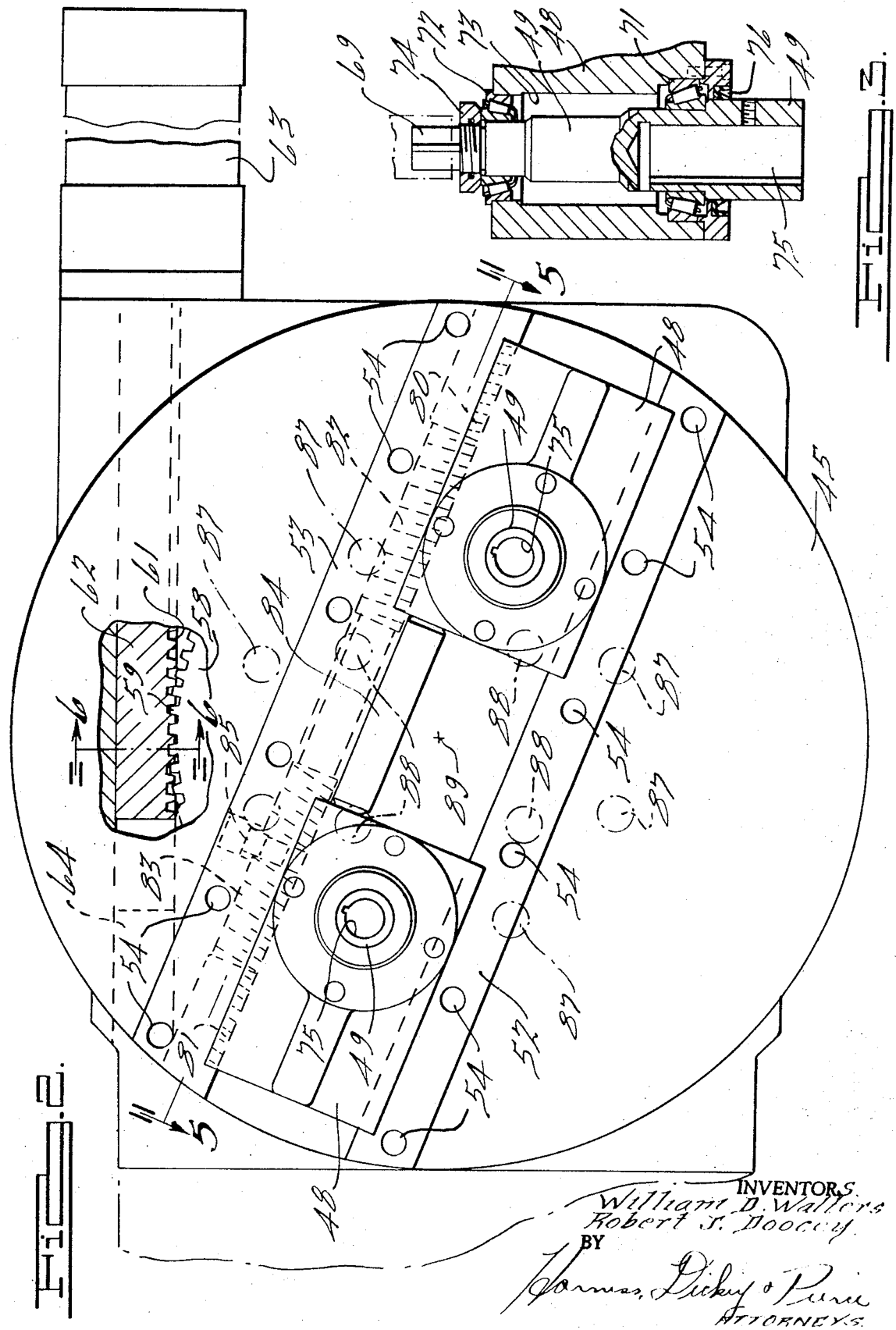

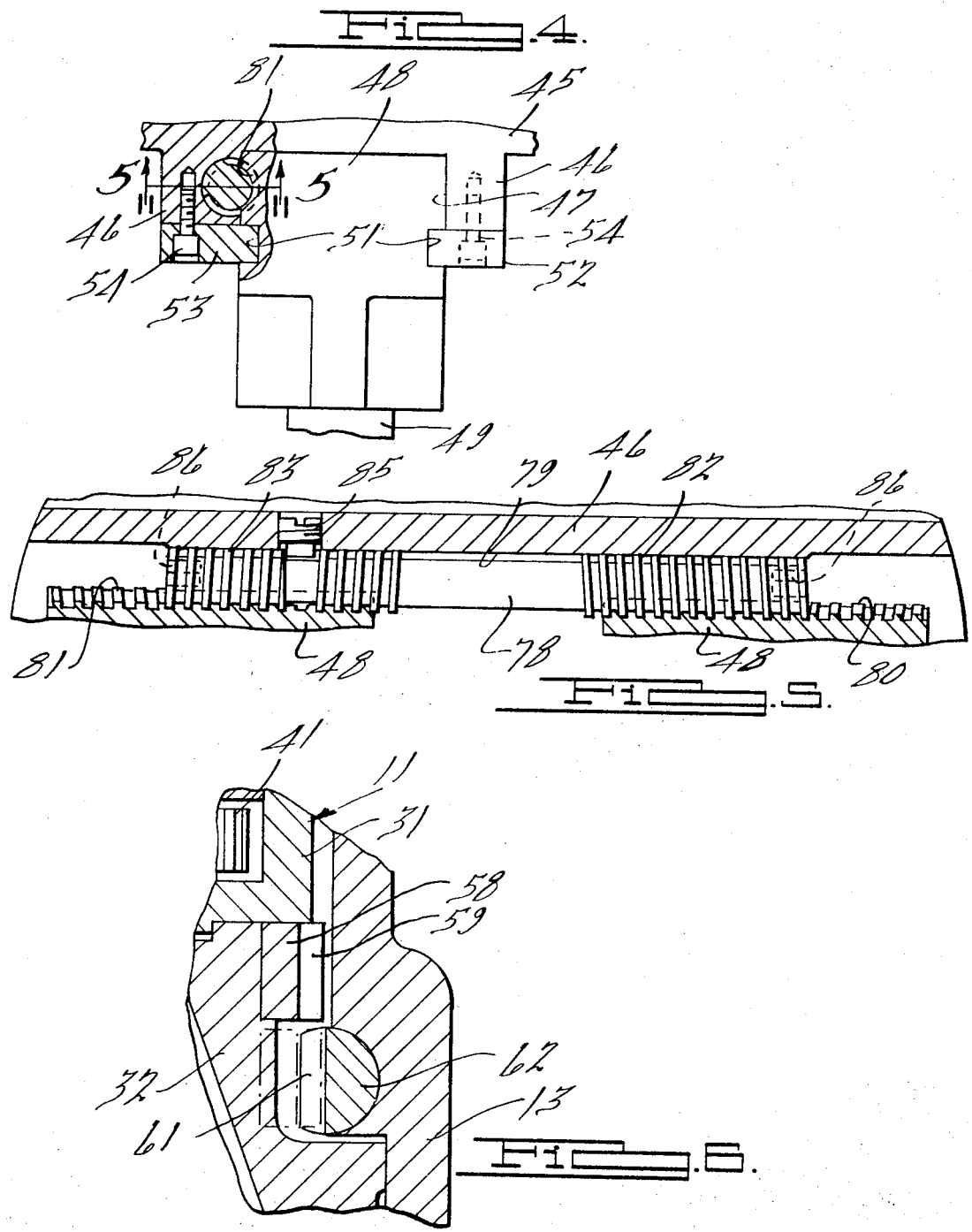

3,652,175

ADJUSTABLE MULTIPLE SPINDLER DRILL HEAD

BACKGROUND OF THE INVENTION

Reference may be had to U.S. Pat. No. 3,509,619 to show the use of change mechanism for a number of non-adjustable multiple spindle drill heads over which the present invention has advantages in adjustability and cost although requiring an increase in time for the drilling operation.

SUMMARY OF THE INVENTION

The invention pertains to a drive through reduction gearing, universal joints and splined shafts for a pair of spindles which are adjustably spaced from each other equidistance from the center of a support head. A ram is carried by the device for moving the head within its support and separating the facing teeth of a pair of flat gears which when engaged accurately located the head after indexing. Upon the movement of the head, a ring gear thereon has its teeth moved into engagement with the teeth of a rack which is advanced a predetermined amount by a ram against a stop block for limiting the degree of rotation and arcuately advancing the two drills about the head center a predetermined angular amount. Thereafter, the head is retracted and the facing teeth of the gears are reengaged to accurately locate the adjusted head and to release the teeth of the ring gear from those of the rack to permit the ram to be retracted. In the example herein illustrated, the facing teeth of the flat gears are 48 in number which permits the head to be advanced 22½°, 45° and 90°, or other equal increments of the 48 teeth, to drill pairs of holes seriatim through the workpiece. The drilling time will be equal to or less than that of other machine operations performed at different stations in the line so that no loss in overall time will occur during the advancement of the workpiece through the machine line.

BRIEF DESCRIPTION OF THE DRAWINGS

FIG. 1 is a broken view in elevation with parts in section showing one of the pair of adjustable multiple spindle heads of the present invention;

FIG. 2 is an end view of the structure illustrated in FIG. 1, as viewed from the point 2 thereof;

FIG. 3 is an enlarged sectional view of the structure illustrated in FIG. 1, taken on the line 3—3 thereof;

FIG. 4 is a broken end view of the structure illustrated in FIG. 1, as viewed from line 4—4 thereof;

FIG. 5 is a broken sectional view of the structure illustrated in FIG. 2, taken on the line 5—5 thereof, and FIG. 6 is an enlarged broken sectional view of the structure illustrated in FIG. 2, taken on the line 6—6 thereof.

DESCRIPTION OF THE PREFERRED EMBODIMENTS

The multiple spindle head 11 is supported on a carriage 12 which is movable upwardly and downwardly on vertical ways (not shown) in the known manner. The carriage supports a housing 13 for upward and downward movement therewith. A drive shaft 14 is supported on bearings 15 within a housing 16 secured in fixed relation to the housing 13. The bearings are spaced by a sleeve 17 and clamped together by a nut 18. The housing 16 has a cylindrical aperture 19 containing a piston 21 guided therein against angular movement by a pin 22. The piston is sealed to the side of the cylindrical aperture 19 by seals 23. Passageways 24 and 25 admit fluid to the top and bottom of the piston 21 for producing its downward and upward movement. A cylindrical extension 26 at the bottom of the piston has a rod 27 threaded within an aperture therein which extends through an aperture 28 at the center of a gear spindle 29. The spindle is carried within a housing 31 fixed to a reciprocable head 32.

A gear 33 on the end of the drive shaft 14 is in mesh with a gear 34 which is secured on the spindle 29 by a nut 35. Teeth 36 on the gear 34 are greater in length than the teeth on the gear 33 since the gear 34 moves axially relative thereto. The spindle 29 is secured to the housing 31 by a set of bearings 38.

The spindle has a gear 39 thereon in mesh with a pair of gears 41 which produces a reduction drive for a pair of spaced spindle shafts 42. The head 32 is supported within the outer end of the housing 13 for reciprocal movement therein. The housing 13 has a flat gear 43 on its outer end the facing teeth of which mesh with those of a flat gear 44 which is carried on the facing side of an outer extension 45 on the head 32.

As illustrated in FIGS. 2 and 4, the extension 45 has spaced upstanding ribs 46 forming a slot 47 therebetween which is located across the diameter at the center 89 of the extension. A pair of housings 48 are disposed within the slot 47 for supporting spindles 49 therewithin. The housings 48 have channel notches 51 extending inwardly from each side in which clamping bars 52 and 53 extend for clamping the housings 48 in fixed position after adjustment toward or away from each other. The bars have a plurality of screws 54 extending therethrough into threaded apertures in the ribs 46 for clamping and releasing the bars and the housings 48. The rod 27 on the piston 21 has a heavy washer 55 secured on the end by a nut 56 with the peripheral edge of the washer confined within an annular notch 57 in the head 32. The washer 55 has clearance within the notch 57 to permit the head to turn relative thereto while permitting the rod 27 and washer 55 to move the head 32 outwardly sufficiently to separate the facing teeth on the flat gears 43 and 44 to permit the head 32 to be arcuately advanced.

A ring gear 58 is secured to the head 32 having teeth 59 thereon which align with the spaces between the teeth 61 of a rack 62 secured to a piston within a cylinder 63. When the head 32 is moved outwardly and the facing teeth of the flat gears 43 and 44 are separated, the teeth 59 of the ring gear 58 will mesh with the teeth 61 of the rack 62. By moving the piston outwardly of the cylinder 63, the rack is advanced to turn the head 52 a predetermined angular amount. A gauge block 64 may be placed in the path of the movement of the rack 62 to be engaged by the end thereof for limiting the rack's advancement. This will turn the head a predetermined angular distance whereupon the piston 21 is moved in a reverse direction, upwardly as illustrated in FIG. 1, for moving the head 32 upwardly and again engaging the facing teeth of the flat gears 43 and 44 which accurately locates the head 32 and the drills in spindles 49 in angular advanced position.

The pair of driven shafts 42 are connected by universal joints 65 to internally splined sleeves 66 which receive splined shafts 67 that are connected by universal joints 68 to the ends 69 of the spindles 49. The splined coupling and universal joints permit the adjustment of the spindle housings 48 toward and away from each other while retaining the driving relation with the spindles 49 therewithin. It is to be understood that the gear 39 drives a second gear 41 on the other drive shaft 42 for driving the other spindle 49 carried by the second housing 48 within the slot 47. Each spindle 49, as illustrated in FIG. 3, is mounted within its housing 48 by a pair of bearings 71 and 72 secured at the end of an aperture 73 therein by a nut 84. The spindle has a tool receiving aperture 75 of conventional form extending inwardly from the end thereof for the reception of a drill or like tool. A seal 76 seals the end of the aperture 73 to the housing 48. An annular notch 77, as illustrated in FIG. 1, is provided on the inner surface of the head 32 for permitting the maximum spacing of the spindles 49 when the housings 48 are separated a maximum distance apart.

When the housings 48 are to be moved closer to or further away from each other, the screws 54 are loosened to permit the housings 48 to slide within the slot 47. To produce the simultaneous movement of the housings 48 toward and away from each other, a lead screw 78 is confined within an aperture 79 disposed parallel to sections of lead screw threads 80 and 81 cut in the same side of the housings 48. The thread section 80 on one of the housings is righthanded, the thread section 81 on the other housing is lefthanded. The lead screw 78 has a righthand thread 82 and a lefthand thread 83 on opposite ends thereof which are in engagement with the thread sections 80 and 81 in the side of the housings 48. By rotating the lead screw after the bars 52 and 53 are loosened, the housings 48 will be adjusted toward or away from the center of the head 32. The spacing of the heads is accurately obtained by the use of a gauge block 84 of desired length. After the two housings 48 engage the ends of the gauge block, the screws 54 are tightened to clamp the housings 48 in adjusted position. This accurately spaced the center of the spindles 49 from the center 89 of the head 23. The lead screw 78 is retained against endwise movement by a set screw 85 extending in a slot within the thread 83 thereof. The ends of the lead screw are provided with Allen head or like recesses 86 by which the lead screw may be rotated from either end.

In the example herein illustrated, there are 48 facing teeth in the flat gears 43 and 44 permitting pairs of holes to be drilled each advancement of the head 32 for a number of holes divisible into 48. If eight holes 87 are to be drilled, after the first pair of holes are drilled the head 32 is moved outwardly to separate the facing teeth of the flat gears 43 and 44 and the head is advanced 45° by the advancement of the rack 62. Thereafter, the facing teeth of the flat gears 43 and 44 are reengaged and the teeth 59 separated from the teeth 61 of the rack which is thereafter retracted. A drilling operation is performed by the pair of drills as the carriage 12 moves downwardly on its supporting ways. It will be noted that this downward force moves the facing teeth of the gears 43 and 44 into more intimate relation to each other. Two additional 45° advancements of the head 32 will take place to drill the two additional pairs of holes so that eight holes 87 will be drilled upon the three advancements of the head 32. The first set of holes to be drilled in the next workpiece will have the pair of drills disposed in the same location as they occupied when the last pair of holes were drilled in the prior workpiece.

In a similar manner, four holes 88 may be drilled in a flanged or other type of workpiece by a single 90° advancement of the head 32 after the first pair of holes are drilled. The holes will be drilled in flanges which vary between small and larger diameters within the range of the slot 47. Once the housings 48 are set to drill holes on a predetermined diameter, this setting will be retained for a large number of workpieces which are to be drilled. The time for drilling the pairs of holes and for indexing the head 32 will be well within the time required for a machine operation on a workpiece at another station in the line so that all operations will occur within the maximum allotted machining time. It can be seen therefor that there is no advantage in employing an expensive multiple spindle drill head which is useful for drilling a specific number of holes on a particular diameter even though it will perform the drilling operation in a time far shorter than required by the present adjustable multiple spindle head. The present drilling head is more universal and substantially cheaper and will perform the multiple drilling operations within the time required for machine operations at other stations. While the drill head is shown mounted for vertical advancement toward the workpiece, it is to be understood that it can be advanced horizontally or at any angle normal to the position in which the flange of the workpiece is supported.

I claim:

1. In a multiple spindle drill head, a pair of shafts for driving a pair of spindles, a support, a drive shaft journaled in said support for driving both spindle shafts, a head for carrying said spindle driving shafts and driving means therefor from said drive shaft, a housing supporting said head for arcuate advancement and reciprocal movement, a piston on said support for advancing and retracting said head, a pair of flat gears carried by said housing and head having facing teeth which are movable into and out of engagement with each other upon the axial movement of the head, a ring gear on said head, a rack having teeth meshable with the teeth of the ring gear but out of engagement therewith when the facing teeth of the pair of gears are engaged, means for advancing said rack when the teeth of the ring gear are in engagement with the teeth thereof and the facing teeth of the pair of flat gears are out of engagement for indexing the head a predetermined amount after which when the facing teeth of the pair of gears are in engagement the rack is retractable to its initial position, a housing for each spindle slidably mounted on the diameter at the end of the head toward and away from each other and the center of the head, clamping means for securing said spindle housings in fixed relation after adjustment, and universal drive means between the spindle driving shafts and the spindles which are driven in different positions of adjustment of the housings.

2. In a multiple spindle drill head as recited in claim 1, wherein a lead screw has left and right hand threads on opposite ends rotatably supported by said head against endwise movement, and sections of a left and right hand lead screw thread in the same side of the spindle housings engaged by the respective threads of said lead screw for advancing and retracting said heads when the lead screw is rotated.

3. In a multiple spindle drill head as recited in claim 2, wherein the opposite sides of the spindle housings has aligned slots therein, clamping bars in said slots, and screws for securing said bars to said head for clamping said spindle housings after adjustment.

4. In a multiple spindle drill head as recited in claim 3, wherein said spindle housings are accurately positioned in spaced relations by a gauge block of predetermined length against which said spindle housings are moved by the rotation of said lead screw.

5. In a multiple spindle drill head as recited in claim 4, wherein the head is indexed a predetermined angular distance by the advancement of said rack limited by a gauge block in the path of movement of the end thereof.

6. In a multiple spindle drill head as recited in claim 5, wherein a gear is provided on the drive shaft for the pair of spindles, a gear train having a gear driven by said drive shaft for driving said pair of spindle driving gears at a predetermined speed through said gear train.

7. In a multiple spindle drill head as recited in claim 6, wherein said gear engaged by the gear on the drive shaft advances with said head and is retained in engagement with said drive shaft gear by having longer teeth thereon so as to remain in meshed relation with the teeth of the drive shaft gear in all positions of advancement.

8. In a multiple spindle drill head as recited in claim 7, wherein after the head is indexed it is accurately located upon the retraction of the head by the engagement of the facing teeth of said pair of gears.

9. In a multiple spindle drill head as recited in claim 8, wherein the gears with the facing teeth are so located that the pressure produced by the work performing operation more securely forces the facing teeth into more secure engagement.

* * * * *

UNITED STATES PATENT OFFICE
CERTIFICATE OF CORRECTION

Patent No. 3,652,175           Dated March 28, 1972

Inventor(s) William D. Walters and Robert J. Doocey

It is certified that error appears in the above-identified patent and that said Letters Patent are hereby corrected as shown below:

Please correct the title to read --Adjustable Multiple Spindle Drill Head--.

Signed and sealed this 1st day of August 1972.

(SEAL)
Attest:

EDWARD M. FLETCHER, JR.      ROBERT GOTTSCHALK
Attesting Officer                Commissioner of Patents